Patented May 2, 1939

2,157,009

UNITED STATES PATENT OFFICE 2,157,009

PHENYLMERCURIC ALIPHATIC HYDROXY CARBOXYLATES AND METHOD OF MAKING SAME

Ralph P. Perkins, Midland, Mich., assignor to The Dow Chemical Company, Midland, Mich., a corporation of Michigan No Drawing. Application July 31, 1933,
Serial No. 683,017

12 Claims. (Cl. 260—13)

This invention concerns a new class of organomercury compounds, viz., phenylmercuric aliphatic hydroxy carboxylates, which are useful as germicides, disinfectants, fungicides, etc., and a method of preparing such compounds.

The new compounds herein described have the general formula:

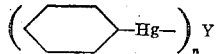

wherein Y represents an aliphatic hydroxy-carboxylic acid radical which may be monobasic or polybasic, and $n$ represents the number of phenylmercuric groups linked with the acid radical.

Such compounds, I have found, may be prepared readily and in good yield by reacting an inorganic phenylmercuric base, preferably phenylmercuric hydroxide, directly with the hydroxy-aliphatic acids of which salts are desired. The phenylmercuric salts, so obtained, have high phenol coefficients as compared with phenol itself, are relatively non-toxic toward animals, and are well adapted to the uses mentioned above.

The invention, then, consists in the new compounds and method of making the same hereinafter fully described and particularly pointed out in the claims. The following description and the examples set forth in detail but several of the various ways in which the principle of the invention may be employed.

The phenylmercuric hydroxide used as a reactant in the present process may be obtained from any source, for example from benzene by the following procedure: A mixture of mercuric oxide with more than its molecular equivalent each of benzene and of glacial acetic acid is heated to between 80° and 120° C. until a sample of the mixture is found by analysis to be substantially free of mercuric ions. The mixture is then cooled to about room temperature, or lower, and filtered to remove insoluble impurities, e. g. polyacetoxymercuri-benzenes. The excess of benzene is removed from the filtrate by distillation, leaving as residue a solution or mixture of phenylmercuric acetate in acetic acid. The acetic acid is preferably, though not necessarily, removed by steam distillation. The residual aqueous solution or mixture of phenylmercuric acetate is treated at between 80° and 100° C. with sufficient water-soluble hydroxide, e. g. sodium hydroxide, potassium hydroxide, barium hydroxide, etc., to convert the phenylmercuric acetate into phenylmercuric hydroxide. The latter is removed by filtration and washed with water.

In place of acetic acid, other lower aliphatic acids, e. g. propionic acid, butyric acid, etc., may be employed in the above described procedure for the preparation of phenylmercuric hydroxide.

Phenylmercuric hydroxide prepared as described above, or otherwise, is suspended or dissolved in a substantially inert liquid, e. g. water, alcohol, etc. The resultant mixture is treated with sufficient hydroxy-aliphatic acid to neutralize the phenylmercuric hydroxide, or with an excess of the acid, if desired, the mixture preferably being stirred and heated to facilitate the neutralization. After the reaction is completed, the phenylmercuric salt product is separated from the mixture by crystallization, by evaporation of the solvent, or otherwise, and may be purified by usual procedure. Usually the product is obtained in excellent yield and as a nearly pure compound.

The following examples describe several ways in which the principle of the invention has been practiced, but are not to be construed as limiting the invention.

Example 1.—Phenylmercuric glycollate

To a suspension of 6 grams (0.0204 mol) of phenylmercuric hydroxide in 50 cubic centimeters of water was added 2 grams (0.0263 mol) of glycollic acid. The mixture was heated on a steam bath for 1 hour, with occasional stirring, after which it was heated under reflux for about 3 minutes and then cooled to room temperature to crystallize the phenylmercuric glycollate product. The latter was filtered from the mixture, washed with water, and dried. There was obtained 6.4 grams (0.0181 mol) of white, crystalline phenylmercuric glycollate. The product melts at approximately 172.5°–173° C. with decomposition and has probably the formula:

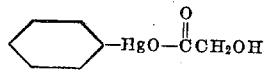

Example 2.—Phenylmercuric lactate

A mixture of 750 grams (3.46 mols) of mercuric oxide, 860 cubic centimeters of glacial acetic acid, and 6.5 liters of benzene was heated to about 100° C. for 5 hours. The mixture was then cooled to room temperature, filtered, and unreacted benzene was fractionally distilled from the filtrate. To the material remaining after said distillation, there was added 2.5 liters of hot (nearly boiling) water. There was then added, gradually and with stirring, 1.6 kilograms (15 mols) of 37.5 per cent sodium hydroxide solution. The mixture was permitted to stand over night, after which the relatively insoluble phenylmercuric hydroxide was separated by filtration and washed with water. The moist phenylmercuric hydroxide was mixed with about 2 liters of water, and to the mixture 295 grams (2.79 mols) of 85 per cent lactic acid was added with stirring. The mixture was then heated to about 100° C. with continued stirring for 1 hour, after which it was cooled to room temperature to crystallize the phenylmercuric lactate product. The latter was filtered from the mixture, washed with water, and dried. There was obtained 891 grams (2.43 mols) of product as a white, crystalline powder. Phenylmercuric lactate melts at approximately 156.5°–157.5° C. and has probably the formula:

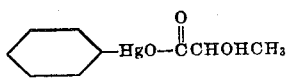

*Example 3.—Phenylmercuric tartrate*

16.5 grams (0.11 mol) of tartaric acid was added gradually and with stirring to a mixture of 54.9 grams (0.186 mol) of phenylmercuric hydroxide in 250 cubic centimeters of water. The mixture was stirred at room temperature for about 5 minutes and then heated under reflux for about 1 hour. The mixture was then cooled to about 40° C. and filtered to separate the crystalline product. The latter was washed with water and dried. There was obtained 60 grams (0.0854 mol) of phenylmercuric tartrate as a white crystalline powder. Phenylmercuric tartrate is difficultly soluble in water and alcohol, but is fairly soluble in hot cyclohexanol and hot acetic acid. The product recrystallized from acetic acid, upon heating, started to decompose at about 225° C. and melted with rapid decomposition when plunged into a bath heated to 238° C. The product has probably the formula:

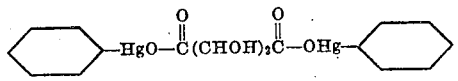

*Example 4.—Phenylmercuric citrate*

15 grams (0.0715 mol) of citric acid monohydrate was added gradually and with stirring to a mixture of 54.9 grams (0.186 mol) of phenylmercuric hydroxide in 250 cubic centimeters of water. The mixture was stirred at room temperature for about 1 hour, after which it was heated under reflux for about 15 minutes, then cooled to about room temperature and filtered to separate the crystalline product. The latter was washed with water and dried. There was obtained 58.7 grams (0.0574 mol) of phenylmercuric citrate as a white, crystalline powder. The product decomposes at about 200°–204° C., is sparingly soluble in water and alcohol but readily soluble in cold glacial acetic acid or hot cyclohexanol and has probably the formula:

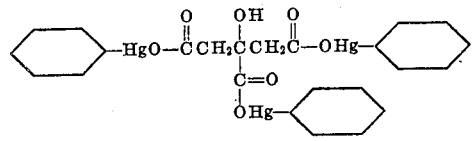

*Example 5.—Phenylmercuric gluconate*

A solution of gluconic acid was prepared by treating 430 grams (1.0 mol) of calcium gluconate with 342 grams (0.922 mol) of 26.4 per cent sulphuric acid, filtering the resultant mixture, washing the residue with water, and combining the washings with the filtrate. To this solution was added 442 grams (1.5 mol) of phenylmercuric hydroxide and sufficient water to build the volume of the entire mixture up to between 2.5 and 3 liters. The mixture was stirred and heated to between 60° and 80° C. for about 1.5 hours, after which it was cooled to room temperature and filtered to separate the crystalline product. The latter was washed with water and dried. There was obtained 664 grams (1.40 mol) of phenylmercuric gluconate. The product crystallizes from water as white platelets, melts at approximately 162.5°–163° C. with decomposition, and has probably the formula:

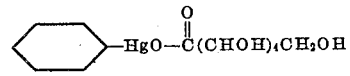

*Example 6.—Phenylmercuric ricinoleate*

A mixture of 300 grams (1.017 mol) of phenylmercuric hydroxide, 299 grams of the mixed fatty acids from castor oil and 300 cubic centimeters of ethyl alcohol was heated under reflux until all of the phenylmercuric hydroxide was dissolved. The alcohol and water were distilled from the mixture under vacuum, leaving 554 grams (approximately 0.96 mol) of crude phenylmercuric ricinoleate as a residue. The product was recrystallized from petroleum ether as light yellow colored crystals melting at 66°–67° C. Phenylmercuric ricinoleate is quite soluble in benzene, alcohol, and related solvents, and has probably the formula:

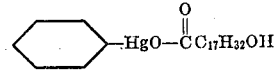

In place of the phenylmercuric hydroxide, phenylmercuric carbonate, or, in fact, any inorganic phenylmercuric base of strength sufficient to react with a hydroxy-aliphatic acid, may be employed as a reactant in preparing phenylmercuric salts of hydroxy-aliphatic acids by the present method. However, I prefer to employ phenylmercuric hydroxide rather than the corresponding carbonate as a reactant, since foaming usually occurs when the carbonate is used.

Phenylmercuric salts of other hydroxy-aliphatic acids, e. g. hydroxy-butyric acids, tartronic acid, maleic acid, etc., may be prepared by reacting an inorganic phenylmercuric base with the acids in accordance with the procedure hereinbefore described.

Other modes of applying the principle of my invention may be employed instead of those explained, change being made as regards the method or compounds herein disclosed, provided the steps or compounds stated by any of the following claims or the equivalent of such stated steps or compounds be employed.

I therefore particularly point out and distinctly claim as my invention:

1. The method of making a phenylmercuric salt of a hydroxy-aliphatic polycarboxylic acid which comprises heating a phenylmercuric base with an aliphatic hydroxy-polycarboxylic acid to a reacting temperature in the presence of a substantially inert liquid.

2. The method of making a phenylmercuric salt of a hydroxy-aliphatic polycarboxylic acid which comprises heating phenylmercuric hydroxide with an aliphatic hydroxy-polycarboxylic acid to a reacting temperature in the presence of a substantially inert liquid.

3. In a method of making a phenylmercuric salt of a hydroxy-aliphatic polycarboxylic acid, the steps of heating phenylmercuric hydroxide with an aliphatic hydroxy-polycarboxylic acid to a reacting temperature in the presence of water and thereafter separating the salt product.

4. In a method of making phenylmercuric tartrate, the step of heating phenylmercuric hydroxide with tartaric acid to a reacting temperature in the presence of a substantially inert liquid.

5. A phenylmercuric salt of an aliphatic hydroxy-polycarboxylic acid containing no free carboxylic acid groups.

6. A phenylmercuric salt of a hydroxy-aliphatic polycarboxylic acid, having the general formula

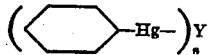

wherein Y represents an aliphatic hydroxy-polycarboxylic acid radical containing no free carboxylic acid groups and $n$ is the number of phenylmercuric groups linked with Y.

7. Diphenyldimercuric tartrate, a white, crystalline compound decomposing at approximately 225° C.

8. Diphenyl dimercuric tartrate.

9. A phenylmercuric tartrate.

10. The method of making a phenylmercuric salt of hydroxy aliphatic acid which comprises heating phenylmercuric hydroxide with an aliphatic hydroxycarboxylic acid to a reacting temperature in the presence of a substantially inert liquid.

11. The method of making a phenyl-mercuric salt of a hydroxy aliphatic acid, which comprises heating a phenyl-mercuric base with an aliphatic hydroxy-carboxylic acid to a reacting temperature in the presence of a substantially inert liquid.

12. In a method of making phenylmercuric lactate, the step of heating phenylmercuric hydroxide with lactic acid to a reacting temperature in the presence of a substantially inert liquid.

RALPH P. PERKINS.